April 3, 1956     P. L. PAULL ET AL     2,740,706
METHOD OF REDUCING METAL OXIDES
Filed Oct. 10, 1951
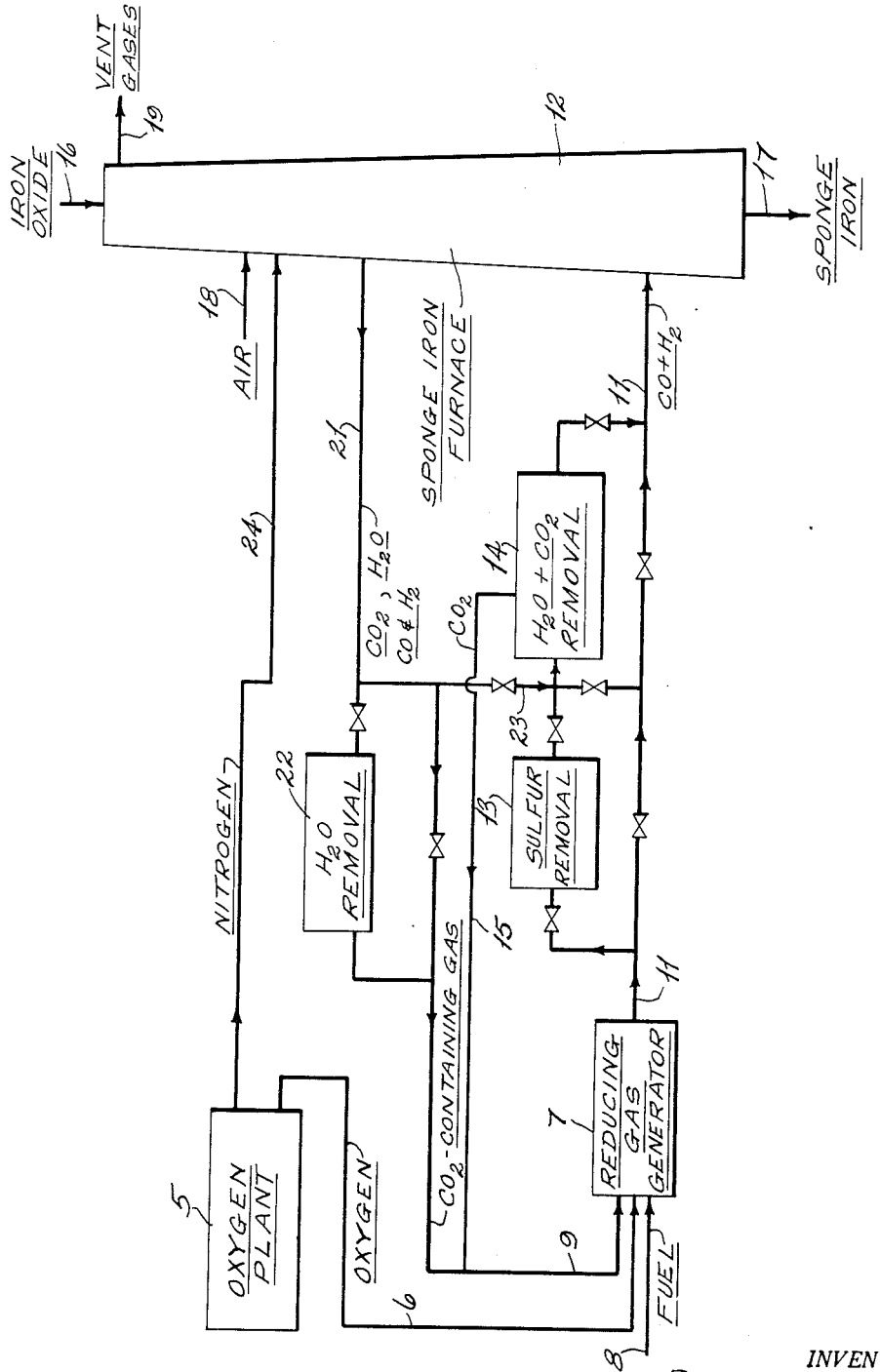
INVENTORS
PETER L. PAULL
F. BURTON SELLERS
BY
ATTORNEYS

United States Patent Office 2,740,706
Patented Apr. 3, 1956

2,740,706

METHOD OF REDUCING METAL OXIDES

Peter L. Paull, Norwalk, Conn., and Frederick Burton Sellers, Tarrytown, N. Y., assignors to Texaco Development Corporation, New York, N. Y., a corporation of Delaware Application October 10, 1951, Serial No. 250,771

5 Claims. (Cl. 75—35)

This invention relates to a process for the reduction of a metal oxide with carbon monoxide and hydrogen. In one of its more specific aspects, this invention relates to a process for the reduction of an iron oxide to metallic iron as sponge iron. Gaseous, liquid or solid fuels are suitable for the generation of hydrogen and carbon monoxide in the process of this invention.

The present invention represents an improvement in the process of reducing metal oxides in which a reducible metal oxide is contacted with a mixture of carbon monoxide and hydrogen at a temperature sufficient for reaction between the reducing gas and the metal oxide but below the temperature at which the metal oxide or reduced metal becomes molten. The reduction of metal oxides with a reducing gas comprising carbon monoxide and hydrogen is known in the prior art. Various ores including iron, nickel, chromium, vanadium, and titanium ores have been reduced in this manner.

The present invention is particularly suited to the production of sponge iron. The term "sponge iron" is used in its broad sense, that is, to denote iron produced by reduction of an iron oxide without melting the oxide or the metallic iron. The reduction of iron ore may be conducted at temperatures ranging from about 1,000° F. to about 2,000° F. Preferably the reduction is carried out at a temperature within the range of from about 1,600° F. to about 2,000° F. In practice it is desirable to maintain the temperature as high as possible, as the rate of reduction is favorably increased by increasing temperature. The upper limit of temperature is determined by the point at which fusion of the ore takes place, or often, for practical purposes, the temperature at which the ore softens and agglomerates. This varies with the source and composition of the ore. Some ores begin to agglomerate at about 1,400° F. while others are capable of withstanding temperatures of about 2,000° F. without agglomeration. The practical limits of temperature range, therefore, from about 1,400° F. to about 2,000° F.

In a process used commercially at the present time, the reduction of iron ore to sponge iron takes place in a reduction furnace in the form of a tall, narrow shaft, slightly larger at the bottom than at the top. High grade iron ore, e. g., magnetite, is preferable as the charge material for the production of sponge iron by this process. With fresh ore added to the top of the furnace and hot carbon monoxide and hydrogen supplied to the bottom, the gas and ore move in countercurrent relationship to one another through the shaft. Reduced iron, or sponge iron, is removed from the bottom of the furnace. As the gases pass up the shaft, they reduce the ore and are, in turn, converted to steam and carbon dioxide. Some of the unconverted gas is burned with air in the upper portion of the shaft to preheat the incoming ore. About 70 per cent of the ascending gas is recycled for the production of carbon monoxide and hydrogen by passing the recycled gas, containing steam and carbon dioxide, over a bed of electrically heated coke.

The present invention is an improvement over the above-described process. In accordance with the present invention, air is rectified to produce an oxygen-rich fraction and a nitrogen-rich fraction, each fraction being richer in the designated component than air. The oxygen is reacted with a suitable fuel, e. g., a gaseous hydrocarbon, liquid hydrocarbon, or solid carbonaceous fuel, under conditions such that the carbon monoxide and hydrogen are produced as the primary products of reaction. This mixture of carbon monoxide and hydrogen is passed into contact with iron ore in the shaft to effect reduction of the ore to sponge iron. By this improved process, the production of metallic iron is made independent of special grades of fuel, such as metallurgical coke, and cheap sources of electricity.

The generation of carbon monoxide and hydrogen mixtures from various carbonaceous and hydrocarbon fuels by partial combustion is fairly well known in the art. In this operation, the fuel is reacted with an oxygen-containing gas, preferably oxygen. Commercially pure oxygen, obtained by rectification of air, is used to produce carbon monoxide and hydrogen substantially free from nitrogen. The nitrogen fraction is usually vented to the atmosphere. With liquid hydrocarbons and solid fuels, sufficient steam is also added to control the temperature within the desired range. The steam serves also to generate hydrogen in the reaction. The generation of carbon monoxide and hydrogen by this process is carried out at a temperature over 2,000° F. and usually below 3,000° F., the upper limit being determined by permissible refractory temperatures. Carbon dioxide may be used instead of steam to limit the temperature and produce additional carbon monoxide. In general, from about one to about three volumes of hydrogen are generated for each volume of carbon monoxide produced in the process.

A novel feature of the present invention is the addition of a stream of gas containing a greater percentage of nitrogen than does air, and suitably relatively pure nitrogen, to the shaft at a point intermediate the point of introduction of the ore and a point at which the reduced iron is withdrawn.

Another feature of the present invention is the production of from about two to three volumes of carbon monoxide for each volume of hydrogen. Most fuels, and particularly gaseous and liquid hydrocarbons, when subjected to partial oxidation, produce greater volumes of hydrogen than carbon monoxide. In the process of this invention, however, carbon monoxide-rich gas is generated by partial combustion. Carbon dioxide obtained from the reduction shaft is passed to the gas generator for conversion to carbon monoxide.

An object of this invention is to provide an improved process for the reduction of a metal oxide with carbon monoxide and hydrogen. A further object of this invention is to provide an improved process for the production of sponge iron by the reduction of an oxide of iron with carbon monoxide and hydrogen. Other objects and advantages of the invention will be evident from the following detailed description and the accompanying drawing.

The drawing illustrates diagrammatically the application of the process of this invention to the production of sponge iron.

With reference to the drawing, the numeral 5 designates an oxygen plant wherein air is fractionated to separate therefrom relatively pure oxygen leaving a residue of relatively pure nitrogen. The oxygen passes through line 6 into a gas generator 7, where it is reacted with fuel entering through line 8. The fuel may be a hydrocarbon, for example, natural gas or oil, or it may be a carbonaceous solid fuel, such as coal.

In the gas generator, the fuel and oxygen are combined to produce a mixture of carbon monoxide and hydrogen. The generation of carbon monoxide and hydrogen by the reaction of a fuel with insufficient oxygen for complete combustion is fairly well-known. The generator is operated at a temperature in excess of about 1,800° F., and preferably in excess of about 2,000° F. In order to produce a mixture of carbon monoxide and hydrogen containing in excess of one volume of carbon monoxide per volume of hydrogen, carbon dioxide is supplied to the generator through line 9. The source of this carbon dioxide will be explained in greater detail hereinafter.

The product gas from the gas generator 7 is discharged through line 11, through which it may be passed directly into the lower portion of a furnace 12 for the reduction of iron oxide or iron ore to sponge iron. Alternatively, the gas may be processed for the removal of sulphur in a sulphur-removal step 13, and/or for the removal of steam and carbon dioxide in a separate treating operation designated by numeral 14.

Sulphur removal may be effected by passing the hot reducing gas stream over sponge iron, suitably a part of that produced in the process. The resulting iron sulfide may then be sent to the sponge iron furnace with the iron oxide charge. Removal of sulphur from the reducing gas is desirable when the fuel supplied to the synthesis gas generator contains an appreciable amount of sulphur, such as, for example, oil shale, coal, sour natural gas or a sour hydrocarbon oil.

The removal of steam and carbon dioxide from the synthesis gas increases the concentration of carbon monoxide and hydrogen in the reducing gas stream supplied to the sponge iron furnace. Various methods for removal of steam and carbon dioxide are known in the prior art. They may be removed for example, by scrubbing the gas with water. Water may be removed by condensation of steam from the gas. Various absorbents, e. g., ethanolamine, are effective for removal of carbon dioxide. The particular method of effecting removal of steam and carbon dioxide is not a part of the present invention, and therefore, needs no detailed description. It is necessary to reduce the temperature of the gas stream to about atmospheric temperature to effect separation of water and carbon dioxide. The carbon monoxide and hydrogen remaining after the reducing gas is treated for removal of carbon dioxide and water in treating step 14 is preheated to the desired temperature prior to its introduction to the furnace. Carbon dioxide removed from the gas stream may be recycled to the reducing gas generator through line 15.

The stream of reducing gas introduced to the furnace through line 11, should be at a temperature as high as may be tolerated in the furnace, i. e., a temperature just below the temperature at which the iron and unreduced iron oxide softens and agglomerates. A suitable temperature is generally around 1,800° F.

The iron oxide is charged into the upper end of the furnace 12, as indicated by line 16. Iron sulfide from the sulphur removal step 13, if it is used, may also be charged to the upper end of the furnace with the iron oxide.

As the reducing gas from line 11 passes up through the furnace, it contacts iron oxide slowly descending through the furnace. In the lower portion of the furnace, the iron oxide is substantially completely reduced to metallic iron to form the sponge iron product, which is removed from the bottom of the furnace as indicated by line 17. The carbon monoxide and hydrogen ascending through the furnace take up oxygen from the iron oxide and are converted to carbon dioxide and steam. This conversion is not complete however, and some of the carbon monoxide and hydrogen pass into the upper portion of the furnace without being converted to carbon dioxide and steam.

In the upper portion of the furnace, air is introduced through line 18 for combustion of carbon monoxide and hydrogen which are not consumed in the reduction of the iron oxide. Burning these gases in the upper part of the furnace preheats the incoming iron oxide to a suitable temperature for reaction with the carbon monoxide and hydrogen in the lower portion of the furnace. At the same time, it effects removal of sulphur from the iron oxide charge by converting the iron sulfide to iron oxide and sulphur dioxide. The sulfide may be present in the ore or iron oxide, or it may be iron sulfide from the sulphur removal step 13, as previously indicated. The resulting hot gas, comprising carbon dioxide, steam, nitrogen, and possibly sulphur dioxide, are vented from the furnace through line 19. The iron oxide is preheated to a temperature as high as permissible with the particular charge stock. This may range from 1,400° F. to 1,800° F., depending upon the softening point of the iron oxide, as previously indicated. The temperature should be kept as high as possible and yet not be permitted to reach a temperature such that excessive crumbling, or sintering or agglomeration takes place. The method of controlling this temperature in accordance with this invention will be described in detail later.

From a mid-point in the furnace 12 a stream of gas is withdrawn through line 21. This gas stream comprises an appreciable quantity of carbon dioxide, but also contains steam and unreacted carbon monoxide and hydrogen. The gas stream withdrawn through line 21 serves as a source of carbon dioxide supplied to the gas generator, through line 9. About 70 per cent of the ascending gas stream is suitably recycled in this manner. Steam may be removed from the gas stream in a water-removal step 22. Water removal may be accomplished by cooling the gas to condense the water. The water removal step is generally unnecessary, particularly where oil or coal is used as the fuel to the gas generator. If the gas generator is supplied with natural gas as fuel, however, it may be desirable to remove water from the gas stream withdrawn through line 21 to prevent high concentrations of hydrogen in the reducing gas produced in the generator.

The recycle gas stream withdrawn from the furnace through line 21 may be passed through line 23 to the water and carbon dioxide removal step 14, the recycled carbon monoxide and hydrogen to the furnace through line 11, and the separated carbon dioxide supplied to generator 7.

As indicated hereinabove, the incoming iron oxide is heated in the upper portion of the furnace to an elevated temperature somewhat below its sintering temperature. In the usual operation of a sponge iron furnace, considerable difficulty is experienced with control of the temperature in this section of the furnace. As a consequence, fine particles become overheated and sinter and, therefore, must be eliminated from the charge. In the present invention, accurate control of the temperature in the upper part of the furnace is achieved by introducing nitrogen from the oxygen plant 5, through line 24, into the upper part of the furnace, preferably just below the point of introduction of air to the furnace. This nitrogen dilutes the gases and eliminates localized and general overheating upon the introduction of air. The introduction of nitrogen may be made responsive to the temperature in the preheating section of the furnace. Because of the accurate temperature control afforded by the process of this invention, in many cases fine particles need not be eliminated from the charge, but may be fed to the furnace together with lump particles of ½ inch or larger.

In some cases it may be desirable to pretreat the fine particles prior to feeding them to the furnace. Conventional practice is to pellet or briquette the fine particles. The pellets or briquettes may be sintered to give them high mechanical strength. These agglomerates may be used in the present process.

The following example illustrates the application of the process to the reduction of iron ore to sponge iron. An iron ore containing approximately 90 weight per cent iron oxide, or approximately 65 weight per cent iron, is employed in the process. The ore is charged in the form of lumps having a diameter between 1.5 and 3.5 inches into the upper part of a shaft reduction furnace.

A reducing gas stream is prepared from natural gas having the following composition:

| Component: | Mol percent |
|---|---|
| Methane | 78.3 |
| Carbon dioxide | 10.0 |
| Ethane | 6.6 |
| Heavier hydrocarbons | 5.1 |

This natural gas is preheated to 1,000° F. and is charged under a pressure of 15 pounds per square inch gauge into a reducing gas generator wherein it is reacted with oxygen of 98 per cent purity, which has been previously preheated to a temperature of 300° F. About 0.8 mol free oxygen is supplied to the generator per mol of natural gas. Carbon dioxide, which has not been preheated, is also charged to the generator in an amount equivalent to about 0.9 mol added carbon dioxide per mol of natural gas.

The product stream discharges from the reducing gas generator at about 2,500° F., is cooled in a waste heat boiler, after which the gas is treated for removal of most of the carbon dioxide and water to give a gas of the following composition:

| Component: | Mol percent |
|---|---|
| Carbon monoxide | 61.1 |
| Hydrogen | 35.8 |
| Nitrogen and argon | 1.4 |
| Carbon dioxide | 1.0 |
| Methane | 0.5 |
| Water | 0.2 |

This gaseous stream is combined with a recycled gas stream, described later, the combined stream is preheated to a temperature of approximately 1,750° F., and passed into the lower section of the ore reduction shaft. This reducing gas stream passes upwardly through the shaft, converting the iron oxides to metallic iron. A stream of gas having the following composition is withdrawn from an intermediate point in the reduction furnace at a temperature of about 1,500° F.:

| Component: | Mol percent |
|---|---|
| Carbon monoxide | 40.6 |
| Hydrogen | 23.7 |
| Carbon dioxide | 21.3 |
| Water | 12.0 |
| Nitrogen and argon | 1.4 |
| Methane | 1.0 |

This gas amounts in volume to approximately 75 per cent of the gas originally charged to the reduction furnace. After withdrawal from the furnace, it is cooled to a temperature below the dew point of the water present and is scrubbed with ethanolamine for carbon dioxide removal. A portion of the carbon dioxide so removed becomes the source of the carbondioxide stream required for the production of the synthesis gas product initially made by the generator. Gas remaining, after removal of carbon dioxide and water, from both the generator and the recycle streams form the reducing gas stream which, after preheating to 1,750° F., is charged to the reduction furnace.

Gas not withdrawn from the intermediate point in the reduction furnace encounters ore mainly in the form of iron oxide making possible an endothermic reaction which increases the temperature in the upper section of the reduction furnace. To control this temperature rise, high purity nitrogen is added at one or more points in this section of the shaft.

Combustible gases not consumed in reducing the ore are burned in the upper portion of the shaft with a controlled mixture of nitrogen and oxygen to heat the ore charge to the reduction furnace. The composition of the iron produced by the reduction furnace is as follows:

| Component: | Mol percent |
|---|---|
| Metallic iron | 81.0 |
| Ferrous oxide | 12.0 |
| Gangue | 7.0 |

Obviously, many modifications and variations of the invention as hereinbefore set forth may be made without departing from the spirit and scope thereof, and therefore only such limitations should be imposed as are indicated in the appended claims.

We claim:

1. In a process for the reduction of a metal oxide wherein a reducible metal oxide is contacted in a downwardly moving bed with an upwardly flowing stream of reducing gas comprising carbon monoxide and hydrogen whereby the metal oxide is reduced and carbon monoxide partially converted to carbon dioxide, a portion of the resulting gas withdrawn from an intermediate point in the bed, and sufficient air introduced above said intermediate point for combustion of the remaining gas, the improvement which comprises introducing a stream of substantially pure nitrogen into said bed above said intermediate point.

2. A process as defined in claim 1, wherein the stream of nitrogen is introduced into the bed at a point above said intermediate point and below the point of introduction of air to the bed.

3. A process for the reduction of iron oxide which comprises maintaining a downwardly moving bed of iron oxide in a reduction zone; continuously introducing iron oxide to the upper portion of said bed; continuously introducing a stream of carbon monoxide and hydrogen containing at least two parts carbon monoxide per part hydrogen into the lower portion of said bed; maintaining a temperature in said bed within the range of from about 1,400° F. to about 2,000° F. and below the sintering temperature of said iron oxide whereby the iron oxide is reduced to metallic iron without fusion and a portion of the carbon monoxide and hydrogen converted to carbon dioxide and water vapor; withdrawing metallic iron from the lower portion of said bed; withdrawing a part of the ascending gas stream comprising carbon dioxide, water vapor, and unconverted carbon monoxide and hydrogen from an intermediate point in said bed; introducing sufficient air above said intermediate point for combustion of the remaining unconverted carbon monoxide and hydrogen; discharging the resulting products of combustion from the upper portion of said bed whereby the incoming iron oxide is preheated to a temperature within the range of from about 1,400° F. to about 2,000° F. but below the sintering temperature; and introducing a stream of substantially pure nitrogen into said bed at a point above the point of withdrawal of said gases and below the point of introduction of air in an amount sufficient to maintain the temperature in the upper portion of the bed below said sintering temperature.

4. In a process for the reduction of an iron oxide to sponge iron wherein the iron oxide is contacted in a downwardly moving bed at a temperature within the range of from about 1,400° F. to about 2,000° F. with an upwardly flowing stream of reducing gas comprising carbon monoxide whereby the iron oxide is reduced and the carbon monoxide partially converted to carbon dioxide, a portion of the resulting gas is withdrawn from an intermediate point in said bed, sufficient air is introduced above said intermediate point for combustion of the remaining combustible gases, and the products of combustion discharged from the upper portion of said bed, the improvement which comprises generating a stream of reducing gas comprising carbon monoxide admixed with gases containing sulphur by partial combustion of a carbonaceous fuel containing sulphur with an oxygen-containing gas, passing the resulting gases into contact with sponge iron in a gas treating zone at a temperature within the range of from about 1,000° F. to 2,500° F. whereby said sulphur-containing gases are removed from the reducing gas, passing the resulting reducing gas comprising carbon monoxide into contact with the iron oxide in said bed, transferring the sulphur-containing iron from said gas treating zone to the upper portion of said bed as part of the charge to said bed whereby the sulphur is converted to a gaseous sulphur compound by reaction with said air and discharged from said bed, introducing a stream of substantially pure nitrogen into said bed at a point above said intermediate point in an amount sufficient to maintain the temperature in the upper portion of the bed below the sintering temperature of said iron oxide.

5. A process as defined in claim 3 wherein said withdrawn part of the ascending gas stream is treated for the removal of carbon dioxide and water vapor therefrom, and the residual gas comprising carbon monoxide and hydrogen is admixed with carbon monoxide and hydrogen from an extraneous source and the resulting gas mixture introduced into the lower portion of the bed.

References Cited in the file of this patent
UNITED STATES PATENTS

| | | |
|---|---|---|
| 379,492 | Pitt | Mar. 13, 1888 |
| 1,401,222 | Wiberg | Dec. 27, 1921 |
| 1,433,854 | Sinding-Larsen | Oct. 21, 1922 |
| 1,917,642 | Furnas | July 11, 1933 |
| 2,048,112 | Gahl | July 21, 1936 |
| 2,545,933 | Tiddy et al. | Mar. 20, 1951 |
| 2,547,685 | Brassert et al. | Apr. 13, 1951 |
| 2,577,730 | Benedict et al. | Dec. 11, 1951 |
| 2,635,957 | Kalling et al. | Apr. 21, 1953 |

OTHER REFERENCES

The Iron Age, June 2, 1949, pages 69 and 71.